United States Patent
Siegel

[15] 3,691,654
[45] Sept. 19, 1972

[54] METAL FOIL LEAD MANUFACTURE
[72] Inventor: Harvey V. Siegel, Mayfield Heights, Ohio
[73] Assignee: General Electric Company
[22] Filed: May 29, 1969
[21] Appl. No.: 828,863

[52] U.S. Cl. ............29/25.18, 29/418, 29/414, 113/119, 204/142, 204/143
[51] Int. Cl. ................................H01j 9/16
[58] Field of Search .....29/630, 629, 25.18; 113/119; 204/142, 143

[56] References Cited

UNITED STATES PATENTS

| | | | |
|---|---|---|---|
| 3,137,645 | 6/1964 | Vaughan et al. | 204/143 X |
| 3,290,761 | 12/1966 | Ho | 29/625 X |
| 3,414,501 | 12/1968 | Kruger | 204/142 X |
| 3,431,092 | 3/1969 | Lehner | 113/119 X |
| 3,484,533 | 12/1969 | Kauffman | 113/119 X |
| 2,944,330 | 7/1960 | Swick | 29/630 B |
| 3,571,899 | 3/1971 | Sobieski | 29/412 |

FOREIGN PATENTS OR APPLICATIONS

| | | | |
|---|---|---|---|
| 256,464 | 8/1926 | Great Britain | 76/105 |

Primary Examiner—John F. Campbell
Assistant Examiner—Robert W. Church
Attorney—James J. Lazna, Henry P. Truesdell, Frank L. Neuhauser, Oscar B. Waddell and Melvin M. Goldenberg

[57] ABSTRACT

A metal foil lead for sealing into vitreous material is comprised of a short length of metal foil ribbon having an etched tongue end portion with a feathered edge completely therearound and an unetched contact end portion. The foil leads may be made by forming a metal foil ribbon with slots in one side edge thereof at spaced points therealong, electrolytically etching the slotted side only of the ribbon to feather the exposed edges thereof, and then transversely severing the ribbon at each of the slots therein to separate it into individual foil leads.

10 Claims, 13 Drawing Figures

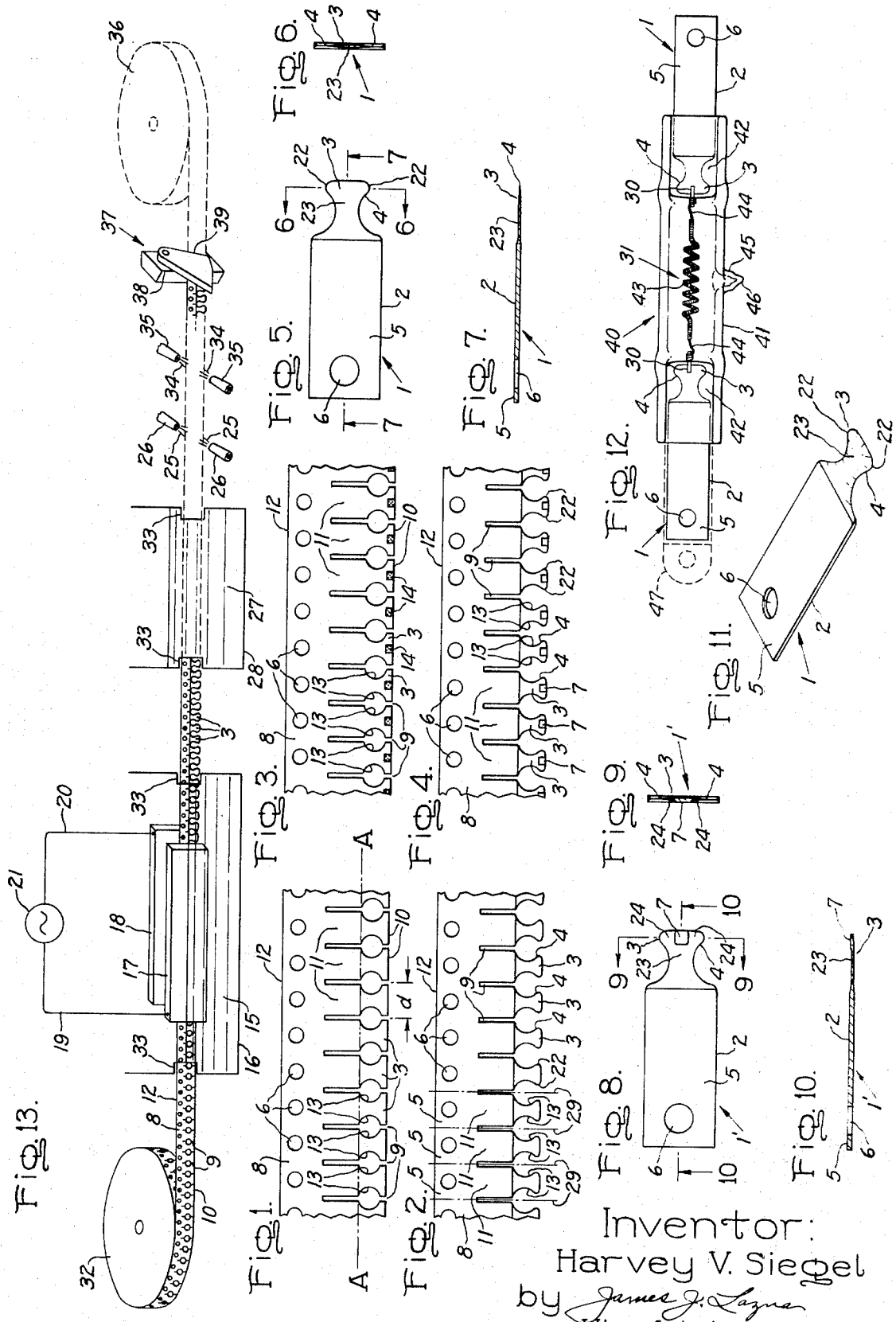

METAL FOIL LEAD MANUFACTURE

BACKGROUND OF THE INVENTION

Field of the Invention

This invention relates to metal foil or ribbon leads, and to the manufacture of such leads, for sealing into vitreous envelopes of quartz or fused silica or of quartz-like high temperature glasses, as in lamp manufacturing.

In making a hermetic seal of a metallic conductor into a lamp envelope made of fused quartz or a quartz-like glass such as 96 percent silica glass, the very high temperatures required for softening and fusing the quartz restricts the choice of metals available for sealing thereinto in practice to molybdenum and tungsten both of which metals have coefficients of expansion much greater, e.g., as much as ten times greater than quartz. To avoid cracking the quartz at the seal upon cooling, the lead-in conductor is shaped, at least over the hermetically sealed portion thereof, as a thin ribbon or foil. The metal foil seal portion of the conductor, having become bonded to the quartz at a relatively high temperature, will merely go into tension without rupturing when the quartz cools, and cracking or shaling of the quartz at the seal is thereby avoided.

For effective sealing into quartz, the metal ribbon or foil should have a width to thickness ratio of at least about 100 to 1, and in the case of the thicker ribbons or foils they should taper down in thickness to the sides at a taper angle not exceeding about 5 degrees to the edges. Metal ribbons or foils having such cross-sectional shape can be made either by longitudinally rolling a central portion of a length of molybdenum wire as described, for example, in U.S. Pat. No. 2,667,595, Noel et al, or by electrolytically etching a ribbon of metal foil. The longitudinally rolled one-piece molybdenum wire leads are particularly suitable for lower currents. For higher currents, or where heavier electrodes or wire leads have to be supported by the metal ribbons or foils during the sealing-in process, the etched metal foils are preferred. Up to the present time, such etched metal foils have generally been produced by electrolytically etching a strip or ribbon of the metal foil of a few millimeters or so in width to feather the side edges thereof, and then cutting the etched foil ribbon or strip into individual foil leads of the proper length required for the seal. An outer wire lead, and either an inner wire lead or an electrode support wire, are then welded to the opposite cut ends of each individual foil lead to thereby form a complete welded ribbon lead-in conductor assembly for sealing into a quartz lamp envelope.

The cutting of the individual etched foil leads from the etched metal foil strip or ribbon ordinarily leaves a burr along the cut edges of each metal foil lead. Owing to the fragility and comparatively small size of these thin metal foil leads, the removal of the burrs from their cut edges is a very difficult and impractical operation. The presence, however, of these burrs along the cut edges of the metal foil leads, together with the appreciable thickness of the metal foil along the cut edges, frequently causes the failure of the seal, the fused quartz eventually cracking adjacent to the cut edges when the seal has cooled down.

Another problem frequently encountered heretofore in the production of etched metal foil leads with welded outer and inner wire leads or conductors is that in the welding of the wire leads to the thin metal foil, the foil is oftentimes burned completely through, thereby resulting in a defective weld. Also, the current-carrying capacity of the entire lead in conductor assembly is limited by that of the thin foil immediately next to the weld. To help obviate these problems, it has been customary, when making the weld of one or both the outer and inner leads to the metal foil lead, to thicken and thus reinforce the metal foil lead at the weld points thereof by the welding thereto of small tabs of the metal foil material which are interposed between the metal foil lead and the wire leads at the respective weld points thereof. However, the cutting, handling and assembly of all these various parts, together with the several welding operations required to form the completed lead-in conductor assembly, renders the fabrication thereof very complicated as well as costly. Moreover, the weld points of the inner and outer wire leads to the metal foil lead, and particularly the outer wire lead weld point, frequently constitute a source of premature failure in the finished seals.

SUMMARY OF THE INVENTION

IT is an object of the invention, therefore, to provide a one-piece metal foil seal and outer lead only the seal portion of which is feather-edged therearound.

Another object of the invention is to provide a metal foil lead of novel conformation having an etched tongue portion at one end with a feathered edge completely therearound and also having an unetched contact lead portion at its other end.

Still another object of the invention is to provide an electrical device having a hermetic pinch seal in which is sealed a lead-in conductor which is comprised of an etched metal foil seal lead portion but which is free of any outer weld between its seal and outer lead portions.

A further object of the invention is to provide a novel method of making thin metal foil leads having an etched tongue portion at one end with a feathered edge completely therearound and also having an unetched contact lead portion at its other end.

A still further object of the invention is to provide a process for forming metal foil leads of the type referred to above at a high production rate from a ribbon of metal foil.

Another object of the invention is to provide a continuous process for producing metal foil leads of the type referred to above by forming a ribbon of metal foil into an interconnected series of foil lead sections which can be separated at the connecting regions into such individual metal foil leads.

Briefly stated, in accordance with one aspect of the invention, the seal lead and outer lead portions of the lead-in conductor assembly of an electrical device are constituted by a single piece of metal foil ribbon having an etched tongue end provided with a feathered edge completely therearound and serving as the seal lead portion of the lead-in conductor assembly, and an unetched contact end portion serving as the outer lead of the assembly.

In accordance with a further aspect of the invention, a strip or ribbon of thin metal foil such as molybdenum foil is first formed with narrow slots spaced along and extending transversely inward from one side edge of the ribbon, after which the slotted side area only of the metal foil ribbon is electrolytically etched to feather the exposed edges of the slotted side area of the ribbon including the edges of the slots therein. The so-formed strip or ribbon is then transversely severed, as needed, at each of the slots therein to separate it into individual foil leads.

Further objects and advantages of the invention will appear from the following detailed description of a species thereof and from the accompanying drawing.

BRIEF DESCRIPTION OF THE DRAWING

In the drawing:

FIG. 1 is a fragmentary plan view of a strip or ribbon of metal foil which as been preformed in accordance with the invention with spaced slots in one of its side edges for use in fabricating metal foil leads comprising the invention;

FIG. 2 is a fragmentary plan view of the metal foil strip or ribbon of FIG. 1 after it has been electrolytically etched in accordance with the invention to feather the exposed edges of the slotted side area thereof including at least the outermost portions of the edges of the slots therein;

FIGS. 3 and 4 are views similar to FIGS. 1 and 2 but showing a modification of the invention wherein protective etch-resist coatings are applied onto localized areas of the metal foil strip adjacent the slotted edge thereof and between the slots therein prior to the etching thereof but subsequently removed therefrom, as shown in FIG. 4;

FIG. 5 is a fragmentary plan view on an enlarged scale of a completed etched foil lead according to the invention formed by the severing thereof from the etched metal foil strip or ribbon of FIG. 2;

FIG. 6 is a sectional view on the line 6—6 of FIG. 5;

FIG. 7 is a sectional view on the line 7—7 of FIG. 5;

FIGS. 8, 9 and 10 are views corresponding to FIGS. 5, 6 and 7, respectively, and showing a metal foil lead cut from the electrolytically etched modified form of metal foil strip or ribbon shown in FIG. 4;

FIG. 11 is a perspective view of the etched foil lead shown in FIGS. 5 to 7;

FIG. 12 is an elevation on an enlarged scale of an electric incandescent lamp provided with a foil seal and terminal structure according to the invention; and FIG. 13 is a diagrammatic view illustrating a continuous process according to the invention for forming a ribbon of metal foil into a series of foil lead sections which may be subsequently separated from one another by cutting to form individual foil leads comprising the invention.

DESCRIPTION OF THE PREFERRED EMBODIMENTS

Referring to the drawings, the foil lead 1 (FIG. 11) according to the invention is comprised of a short length 2 of thin metal foil ribbon such as, for example, molybdenum or tungsten foil having a thickness of, for instance, around 0.003 to 0.004 inch, and having an etched tongue end or electrode portion 3 provided with a feathered edge 4 completely therearound. The metal foil ribbon 2 is of a length and width corresponding approximately to the length and width desired for the finished metal foil lead 1. For example, in the particular case illustrated, the metal foil strip or ribbon 2 may have a width of approximately one-fourth inch, and a length of around 1 inch or thereabouts. The other end portion 5 of the metal foil length 2 is unetched and serves as an outer lead or terminal contact for the electric lamp or other electrical device into which the foil lead 1 is to be sealed. The outer end portion 5 of the foil lead is preferably provided, adjacent its outer end, with a locating aperture 6 of circular or other suitable shape, for use in fixing the location of the foil lead in the seal during the formation thereof.

As shown in FIG. 5, the etched tongue or inner end electrode portion 3 of the foil lead 1 preferably is of generally pandurate or spade-shaped contour in order to thereby provide a feathered edge 4 of extended length for sealing into the quartz or fused silica envelope of an electric incandescent lamp or other electrical device. From the unetched outer end portion 5 of the foil lead 1, the etched tongue end portion 3 tapers gradually down in thickness to a sharp edge 4 around substantially its entire contour, as shown in FIGS. 6 and 7. For certain applications, and especially for use with inner wire leads of larger sizes that are to be welded to the etched tongue end portions of the foil leads 1, the tongue end or electrode portion 3 may be formed at its tip end with a thicker end plateau welding area 7 on one or both sides of the foil lead, as shown in the modified foil lead 1' in FIGS. 8 to 10, the added foil thickness at the welding plateaus serving as an additional protection against the burning through of the foil during the welding of the wire lead to the foil lead.

In accordance with the invention, foil leads 1 of the construction described above and illustrated in FIGS. 5 to 11 may be produced economically and at high production rates by first forming a strip or ribbon 8 (FIG. 1) of thin metal foil such as, for example, molybdenum or tungsten foil having a thickness of, for instance, around 0.003 to 0.004 inch, with a series of spaced narrow slots 9 in one side edge 10 thereof so as to form the ribbon into a series of individual foil lead sections 11. The other side edge 12 of the metal foil ribbon 8 is left unformed with any such slots 9. As shown, the slots 9 extend transversely of the foil ribbon 8, and they are spaced apart therealong a distance d (FIG. 1) corresponding approximately to the width desired for the finished metal foil leads 1. The metal foil ribbon 8 is of a width likewise corresponding approximately to the length desired for the finished metal foil leads 1. For example, in the particular case illustrated, the metal foil ribbon 8 may have a width of approximately 1 inch, and the slots 9 may be spaced apart a distance d of around one-fourth inch or thereabouts. The slots 9 themselves may have a width of around one thirty-second inch or so, and they extend inwardly of the ribbon 8 from the edge 10 thereof a distance at least equal to the desired length of the etched tongue end or electrode portions 3 of the finished foil leads 1. In the particular case illustrated, wherein the etched tongue end portion 3 of the finished foil lead is of a length around one-fourth to five-sixteenths inch, the slots 9 may extend inwardly from the edge 10 of the foil ribbon 8 a distance (around nine-sixteenths inch in the particular case illustrated) approximately equal to or slightly more than one-half the width of the ribbon 8.

As shown in FIG. 1, the slots 9 are preferably widened for a short portion of their length inwardly removed from the edge 10 of the metal foil ribbon 8, as indicated at 13. The widened portions 13 of the slots 9 may be formed by shallow U-shaped or approximately semicircular shaped notches, as shown, and they extend outwardly of the ribbon 8 toward its slotted side edge 10, from the inner end of that portion of the length of each foil lead section 11 which is to form the etched tongue end portion 3 of the finished foil lead 1, for a distance around half the length or more of such tongue end portions 3 of the foil lead sections 11. As shown, the metal foil ribbon 8 may be also formed with a series of locating apertures 6 of circular or any other suitable shape adjacent its unslotted edge 12 and located approximately on the medial lines of the respective lead sections 11.

Where the modified form of metal foil leads 1' shown in FIGS. 8 to 10 are to be formed, having the welding plateaus 7 at the outer tip ends of the etched tongue end portions 3 of the foil leads, the metal foil ribbon 8 in such case is provided with discrete protective coatings 14, as shown in FIG. 3, of a suitable etch-resist masking material applied to those localized areas of the ribbon 8, adjacent the edge 10 thereof and between the successive slots 9 therein, which correspond to and are to form the welding plateaus 7 on the finished foil leads 1'. These etch-resist protective masking coatings 14 may be applied either to both sides of the metal foil ribbon 8 or to one side only thereof, or successive ones of the coatings 14 may be applied onto alternately opposite sides only of the ribbon 8. The etch-resist protective masking coatings 14 may be applied either to both sides of the metal foil ribbon 8 or to one side only thereof, or successive ones of the coatings 14 may be applied onto alternately opposite sides only of the ribbon 8. The etch-resist protective masking coatings 14 may be constituted of any suitable material which will resist the etching action of the etchant medium to which the metal foil ribbon 8 is to be subsequently subjected during the etching thereof. For example, where the metal foil ribbon 8 is made of molybdenum and is to be subsequently etched in a sodium hydroxide etching solution, the etch-resist protective coatings 14 in such case may be composed of a material such as that commercially known as black silicone rubber auto seal flexible adhesive sealant manufactured by applicant's assignee, which material is completely resistant to any etching action thereon by the sodium hydroxide etching solution and which will therefore act to effectively mask the metal foil ribbon 8 from the etching action of such an etching solution. The material of which the etch-resist protective coatings 14 are constituted should be sufficiently adherent to the metal foil strip or ribbon 8 to remain firmly in place thereon during the subsequent etching of the ribbon.

The slotted metal foil strip or ribbon 8 of either FIG. 1, or of the modified form shown in FIG. 3 having the etch-resist coatings 14 applied thereto, is then electrolytically etched over substantially its entire length but throughout that slotted side area portion only of its width which extends inwardly from the slotted edge 10 to the line A—A (FIG. 1) and corresponds approximately to the length which the etched tongue end portions 3 are to have in the finished foil leads 1 or 1', to thereby feather the exposed edges of such slotted side area portion of the metal foil ribbon, including the edges 10 of the ribbon as well as the edges of the slots 9 therein. The etching of the metal foil strip or ribbon 8 may be conveniently carried out by immersing the slotted side area of the strip or ribbon 8 up to the etch line A—A (FIG. 1) in a bath 15 (FIG. 13) of a suitable etching electrolyte such as, for instance, a 50 percent solution of sodium hydroxide in the case where the metal foil strip or ribbon 8 is constituted of molybdenum, which electrolyte bath 15 is contained within an etching tank 16. The metal foil strip or ribbon 8 is positioned in the electrolyte bath 15 between and in parallel relation to a pair of parallel extending copper bar type electrodes 17 and 18 which are likewise immersed in the electrolyte bath and which are respectively connected, as by electrical conductors 19 and 20, to the opposite sides of an A.C. power source 21. The etching of the metal foil strip or ribbon 8 is continued until all the exposed edges of the tongue end portions 3 of the individual foil lead sections 11 of the strip or ribbon 8 are feathered to a sharp edge and the corners of the tongue end portions 3 are rounded off, as shown at 22 in FIGS. 2 and 4. The length of time during which the metal foil strip or ribbon 8 must be subjected to the electrolytic etching action in order to accomplish the above object will, of course, depend on various factors such as the amperage of the etching current applied to the electrodes 17, 18, the spacing of the metal foil strip or ribbon 8 from the electrodes 17, 18, the composition and temperature of the electrolyte 15 employed, and the composition and thickness as well as the partial width of the metal foil strip or ribbon 8 to be etched. However, for a molybdenum metal foil strip or ribbon 8 of approximately 0.003 inch thickness which is to be etched to a width of around one-fourth to five-sixteenths inch from its edge 10 and which has its flat side surfaces spaced a distance of around one-half inch from the respective electrodes 17, 18, and with an electrolyte 15 at room temperature and composed of a 50 percent solution of sodium hydroxide, an etching time of approximately one to two minutes with an etching current of around six amperes applied to the electrodes 17, 18 ordinarily will suffice to accomplish the required degree of etching of the metal foil strip or ribbon 8, as described above.

Etching is most rapid at the edges of the tongue end portions 3 of the foil lead sections 11 of the strip or ribbon 8 and is a maximum at the corners thereof. This causes the corners to become rounded as indicated at 22 in FIGS. 2 and 4, and the edges to become feathered to a sharp edge, as illustrated at 4 in FIGS. 6 and 7. However, etching takes place all over the tongue end portions 3 of the metal strip or ribbon 8 which are immersed in the electrolyte 15. In the case of the modified form of metal foil strip or ribbon 8 of FIG. 3, however, wherein etch-resist protective coatings 14 are provided on localized areas of the tip ends of each of the tongue end portions 3 of the metal foil strip or ribbon 8, etching takes place over all the tongue end portions 3 except in the areas masked off by the etch-resist protective coatings 14 where the etching electrolyte does not have access to the metal foil. This results in thicker localized areas or plateaus 7 (FIG. 4) at the tip ends of each foil lead section 11 of the metal foil strip or ribbon 8, where the etch-resist protective coatings 14 mask off such areas of the ribbon, these thicker plateau areas 7 remaining at the original thickness of the metal foil strip or ribbon 8, in the case where the masking coatings 14 are applied to both sides of the metal foil strip or ribbon 8 but being reduced to a thickness somewhere around three-fourths that of the original foil thickness in the case where the masking coatings 14 are applied to one side only of the metal foil strip or ribbon 8. From the thicker end plateau areas 7 on the etched tongue end portions 3 of the modified form of etched metal foil ribbon 8 shown in FIG. 4, the foil thickness tapers down to that of the adjacent etched central and side areas 23 and 24, respectively, of the tongue end portions 3, as shown in FIGS. 9 and 10. Along the medial center line of the etched tongue end portion 3 of each foil lead section 11, the thickness in the central region 23 thereof may be around half or less than half the original thickness of the metal foil prior to the etching thereof. Thus, where the original foil thickness was in the range of 0.003 to 0.004 inches, the thickness along the medial line of each tongue end portion 3 at its central region 23 after etching may be around 0.001 inch. The thickness of the tongue end portion 3 of each foil lead section 11 tapers transversely thereof to zero at the edges, as shown at 4 in FIGS. 6 and 9.

Upon completion of the etching operation, the etched metal foil strip or ribbon 8 is withdrawn from the electrolyte bath 15 and, in the case of the modified form of etched foil strip or ribbon 8 of fIG. 4, the protective masking coatings 14 then stripped off the ribbon 8 in a suitable manner as, for example, by scraping the coatings 14 off the ribbon 8 with a stripper knife. Any remaining electrolyte on the strip or ribbon 8 is then removed therefrom in a suitable manner, as by washing it off either by directing a water spray 25 against the opposite flat sides of the strip or ribbon 8 from spray nozzles 26 (FIG. 13), or by immersing the metal foil strip or ribbon 8 in a water rinse bath. Preferably, however, the remaining etching electrolyte on the metal foil strip or ribbon 8 is removed therefrom by first immersing the ribbon in a neutralizing acid bath 27 (FIG. 13) contained in a tank 28 to cause the remaining sodium hydroxide etchant, which is a base, to react with the acid to form a salt, and then washing off the resulting reaction product along with any acid or other foreign material remaining on the strip or ribbon 8 in a suitable manner, preferably by directing a water spray 25 from the nozzles 26 against the opposite flat sides of the strip or ribbon 8, followed by immersion thereof in an alcohol rinse bath contained in a tank (not shown), the alcohol absorbing any of the rinse water remaining on the strip or ribbon 8 and being easier to dry off the strip or ribbon than the water alone.

The resulting metal foil strip or ribbon 8 (FIGS. 2 and 4) which is formed by the above-described processing operations, and which is comprised of a series of foil lead sections 11 having etched tongue end portions 3 of the feathered edge form and shape described hereinabove and joined together at their outer contact end portions 5 (FIGS. 2 and 4) along the unslotted side or edge 12 of the ribbon, is then transversely severed at each of the slots 9 therein, along the cutting lines 29 as shown in FIG. 2, to thereby separate the strip or ribbon 8 into individual foil leads 1 or 1' (FIGS. 5 to 11) each having an etched feather-edged tongue portion 3 for welding thereto of the inner wire lead 30 of a filament mount 31, as shown in FIG. 12, and subsequent sealing thereof into a quartz envelope of an electric lamp in the manner customary in the lamp making art. In the case of foil leads 1' of the modified form shown in FIGS. 8 to 10, having the welding plateaus 7 at the tip ends of their etched tongue end portions 3, the added thickness of the metal foil at the welding plateaus 7 serves as an additional safeguard against the burning through of the foil during the welding of the inner wire lead 30 to the foil lead 1'.

While the above-described method according to the invention for making foil leads 1 or 1' of the type shown in FIGS. 5 to 11 may be practiced as a batch process wherein individual metal foil strips 8 of determinate length are formed to the desired foil lead shaped sections 11 as shown in FIGS. 2 and 4 and then later cut into individual foil leads 1 or 1', or the foil lead sections 11 instead cut from the metal foil ribbon 8 prior to the etching thereof and then individually etched to form the finished foil leads 1 or 1', it is preferable to practice the described method as a continuous process as shown in FIG. 13 wherein the metal foil strip or ribbon 8 to be processed is in the form of a continuous ribbon thereof which may be contained on a supply spool 32. The continuous ribbon 8 of metal foil on the supply spool 32 may be either preformed with the spaced slots 9 (FIGS. 1 and 3), or it may be of plain form unprovided with such slots. Where the supply of metal foil ribbon 8 on the spool 32 is of plain unslotted form, it is withdrawn from the spool 32 and guided into suitable means such as a slotting punch (not shown) which punches the spaced slots 9 in the side edge 10 of the ribbon 8. The slotted continuous ribbon 8 of metal foil is then passed, with its slotted edge 10 facing downwardly, through the etching electrolyte bath 15 in the tank 16 (as by passing the ribbon through suitable liquid-tight seals 33 in the side walls of the tank) and between and in parallel relation to the parallel extending copper bar electrodes 17, 18 therein, which are electrically connected by the conductors 19, 20 to an A.C. power supply 21, to thereby effect the electrolytic etching of the advancing metal foil ribbon 8 to the desired final configuration thereof as shown and described above in connection with FIGS. 2 and 4. During its passage through the etching tank 16, only the slotted side edge 10 of the metal foil ribbon 8 is immersed in the electrolyte bath 15 up to the desired etching line A—A (FIG. 1) of the ribbon. The rate of movement of the metal foil ribbon 8 through the etching electrolyte bath 15 and the etching time thereof is so adjusted, in relation to the other etching rate control factors such as the etching current, the composition and temperature of the etching electrolyte 15, and the composition, thickness and width of the metal foil ribbon 8 and the spacing thereof from the respective electrodes 17, 18, as to effect the required degree of etching of the metal foil ribbon, as described hereinbefore.

From the etching tank 16, the continuous ribbon 8 of metal foil is then passed through a neutralizing acid bath 27 in a tank 28, through suitable liquid-tight seals 33 therein, to cause any of the caustic alkali electrolyte 15 (e.g., sodium hydroxide solution) remaining on the ribbon to react with the acid to form a salt. From the neutralizing acid bath 27, the ribbon 8 is then guided past water sprays 25 directed against the opposite flat sides of the ribbon by spray nozzles 26 to wash off the reaction product of the neutralizing acid 27 and electrolyte 15 as well as any excess acid remaining on the ribbon 8. The washed ribbon 8 may then be passed, if desired, through an alcohol rinse bath (not shown) to cause absorption by the alcohol of any rinse water remaining on the ribbon 8, and then guided past a pair of air jets 34 directed against the opposite flat sides of the ribbon 8 by a pair of air nozzles 35 to effect the thorough drying of the ribbon. The dried metal foil ribbon 8 then may either be wound onto a take-up spool 36, which may be suitably rotated to effect the withdrawal of the ribbon 8 off the supply spool 32 and its advance movement through the tanks 16 and 28, for subsequent severing of the coiled ribbon 8 into individual foil leads 1 or 1', as needed, or the processed ribbon 8 may be fed by a pair of suitable feed rolls (not shown) to a severing mechanism 37 comprising, for example, a stationary bed knife 38 and a movable shearing knife 39, for cutting the ribbon 8 along the transverse cutting lines 29 (FIG. 2) into individual foil leads 1 or 1'.

The above-described continuous process according to the invention for fabricating a shaped metal foil ribbon 8 of the configuration as shown and described in connection with FIGS. 2 and 4 and subsequently severing the shaped ribbon 8 into individual foil leads 1 or 1' of the type illustrated in FIGS. 5 to 11, is of particular advantage for the reason that the continued advance movement or travel of the metal foil ribbon 8 through the etching electrolyte bath 15 acts to break up the bubbles which ordinarily tend to form in the etching electrolyte solution 15 during the etching operation and which would partially block the passage of the etching current through the electrolyte and so cause a variation in the rate of etching and therefore the degree of etching of the metal foil ribbon. The breaking up of the bubbles in the etching electrolyte 15 assures a more uniform current flow through the etching electrolyte at all times during the etching operation, and thus a more uniform rate of etching of the metal foil ribbon 8. Consequently, greater reproducibility of results in the shape and form of the etched metal foil ribbon 8 and in the individual foil leads 1 or 1' to be cut therefrom is afforded by the continuous process according to the invention. In addition, the movement of the metal foil ribbon 8 through the etching electrolyte solution 15 acts to minimize the heating of the electrolyte by the etching current passing therethrough as well as to assure the uniform heating of the electrolyte. Since the etching electrolyte solution 15 becomes more reactive and its etching rate increases the higher its temperature, the minimization of the heating of the electrolyte by the etching current and the maintenance thereof more nearly at a uniform temperature during the etching operation, which conditions are inherent in the continuous process as described above, therefore likewise assures greater reproducibility and uniformity of results in the shape and form of the etched metal foil ribbon 8 and the foil leads 1 or 1' which are subsequently cut therefrom.

FIG. 12 illustrates an electrical device, for example, an electric incandescent lamp 40 of the well known tungsten-halogen regenerative cycle type, provided with a lead-in conductor assembly and seal according to the invention. As there shown, the particular lamp 40 illustrated comprises a tubular envelope 41 of quartz or quartz-like glass formed at its opposite ends with conventional type flattened pinch seals 42 into each of which is sealed the etched feather-edged tongue end portion 3 of a foil lead 1 or 1' of the type according to the invention and having an inner wire lead 30 welded to the tip end of its tongue end portion 3. As shown, the foil leads 1 or 1' are sealed into the pinch seals 42 with their etched flat tongue end portions 3 projecting into and disposed flatwise within and embedded in the flattened pinch seals 42 and with their unetched contact end portions 5 projecting endwise from the envelope outwardly from the outer ends of the pinch seals 42 to thereby serve as the terminal contacts for the lamp. Disposed within the envelope 41 is a tungsten filament 43, for example, a linear coil or coiled-coil of tungsten wire disposed more or less axially within the tubular envelope 41, which is electrically connected at its opposite ends in a suitable manner, as by means of connecting spud wires 44 for instance, to the inner wire leads 30 welded to respective ones of the metal foil leads 1 or 1'. The envelope 41 also contains a filling of inert gas such as argon plus a small amount of a halogen such as iodine or bromine or compounds thereof, as is well known in the art, the envelope 41 being exhausted and the gas filling introduced thereinto through an exhaust tube 45 which is then tipped off as indicated at 46. In manufacturing such a lamp 40, the filament 43 is first connected at its opposite ends, as by means of the connecting spud wires 44, to the inner wire leads 30 of respective foil leads 1 or 1' to form a lamp mount assembly 31 which is then inserted into the tubular envelope 41 and held in proper sealing position therein while the pinch seals 42 are formed at the opposite ends of the envelope, and the gas filling introduced thereinto and the exhaust tube tipped off, all in the manner customary in the art. During this sealing-in of the lamp mount assembly 31 into the envelope 41, the lamp mount assembly may be accurately held in place therewithin by suitable jig means (not shown) engaging with the locating apertures 6 of the foil leads 1 or 1', thereby enabling the fabrication of lamps with uniformly centered and aligned filaments 43 within the lamp envelope 41. If desired, a supplemental metal base or lug 47, as shown in dotted lines in FIG. 12, may be suitably fastened to the projecting outer end portions 5 of each of the foil leads 1 or 1', as by welding or clamping for example, to thereby serve as the terminal contact members for the lamp.

Metal foil leads 1 or 1' of the type comprising the invention are much easier and considerably less expensive to fabricate than the prior conventional type multi-part metal foil lead-in conductor assemblies and the rolled wire ribbon leads referred to hereinabove. For example, metal foil leads according to the invention can be made at a cost around one-fiftieth that of a rolled wire ribbon lead. Also, failure of the seal and consequent premature failure of the lamp itself, due to corrosion of the outer weld in prior type lead-in conductor assemblies, is substantially eliminated in lamps employing metal foil leads according to the invention because of the absence of any such outer weld. Longer lamp life is thereby afforded by the use of metal foil leads 1 or 1' comprising the invention. Moreover, seals employing metal foil leads 1 or 1' according to the invention can be safely operated at temperatures well above 300°C, such as are encountered in lamps designed to operate at high current ratings, without the likelihood of the seal failing due to corrosion of the lead. By way of contrast thereto, such high seal temperature operation is not feasible with seals employing rolled wire ribbon leads because of the susceptibility of such leads to corrosion at such elevated seal temperatures.

What I claim as new and desire to secure by Letters Patent of the United States is:

1. The method of making thin metal foil leads for sealing into vitreous material which comprises the steps of forming a flat ribbon of metal foil having slots in one side edge thereof at spaced points therealong, electrolytically etching the slotted side area only of the said flat metal foil ribbon to feather the exposed edges of said slotted foil area to a sharp edge, and then severing the etched flat metal foil ribbon transversely of its length at each of the said slots therein to separate the ribbon into individual flat metal foil leads each comprised of an etched tongue end foil portion having feathered edges completely therearound and an unetched contact end foil portion.

2. The method as specified in claim 1 wherein the said slots in the metal foil ribbon are formed with widened inner portions.

3. The method as specified in claim 1 wherein the said metal foil ribbon consists of molybdenum.

4. The method as specified in claim 1 wherein the said ribbon of metal foil is of continuous form and the said electrolytic etching of the ribbon is effected by longitudinal passage of the said slotted side area only thereof through an etching electrolyte between and in spaced parallel relation to a pair of elongated spaced electrodes disposed within the electrolyte and electrically connected to respective sides of an A.C. power supply.

5. The method of making thin metal foil leads for sealing into vitreous material which comprises the steps of forming a flat ribbon of metal foil having slots in one side edge thereof at spaced points therealong and applying discrete protective coatings of an etch-resist masking material on at least one side of the said flat metal foil ribbon over localized areas thereof at its slotted side edge and between adjacent ones of the said slots therein, electrolytically etching the slotted side area only of the said flat metal foil ribbon to feather the exposed edges of said slotted foil area to a sharp edge, removing the said protective coatings from the metal foil ribbon, and then severing the etched flat metal foil ribbon transversely of its length at each of the said slots therein to separate the ribbon into individual flat metal foil leads each comprised of an unetched contact end foil portion and an etched tongue end foil portion having feathered edges completely therearound except for the unetched end plateau areas of the foil leads masked off by the said etch-resist protective coatings during the etching of the ribbon.

6. The method of preparing a continuous flat ribbon of metal foil for subsequent separation into individual flat foil leads having feathered edges at one end only thereof which comprises the steps of forming a flat ribbon of metal foil having slots in one side edge thereof at spaced points therealong, and then electrolytically etching the slotted side area only of the said flat metal foil ribbon to feather the exposed edges of said slotted foil area to a sharp edge.

7. The method as specified in claim 6 wherein discrete protective coatings of an etch-resist masking material are applied on at least one side of the metal foil ribbon, prior to the said etching thereof, over localized areas of the ribbon at its slotted side edge and between adjacent ones of the said slots therein, and the said protective coatings then removed from the metal foil ribbon after the said etching thereof.

8. The method as specified in claim 6 wherein the said electrolytic etching of the said metal foil ribbon is effected by longitudinal passage of the said slotted side area only of the ribbon through an etching electrolyte between and in spaced parallel relation to a pair of elongated spaced electrodes disposed within the electrolyte and electrically connected to respective sides of an A.C. power supply.

9. The method as specified in claim 8 wherein discrete protective coatings of an etch-resist masking material are applied on at least one side of the metal foil ribbon, prior to the said etching thereof, over localized areas of the ribbon at its slotted side edge and between adjacent ones of the said slots therein, and the said protective coatings then removed from the metal foil ribbon after the said etching thereof.

10. The method of making thin metal foil leads for sealing into vitreous material which comprises the steps of forming spaced arcuate slots on one longitudinal edge of a metal foil strip leaving electrode portions freely extending therefrom, each said electrode portion configured to define an enlarged free end portion and a necked down intermediate portion, etch resist masking a portion of the surface area of the said enlarged free end portions of said electrode portions and leaving the said necked down portions thereof exposed, feathering the exposed portions of said electrode portions to a sharp edge by electrolytically etching the said portions, and then forming the completed foil leads by transversely separating the said foil strip at each of said slots.

* * * * *